United States Patent [19]

Yuta

[11] Patent Number: 4,782,562
[45] Date of Patent: Nov. 8, 1988

[54] TWO-PART PLASTIC CLIP

[75] Inventor: Kiyoteru Yuta, Toyohashi, Japan

[73] Assignee: Emhart Enterprises Corp., Farmington, Conn.

[21] Appl. No.: 52,808

[22] Filed: May 21, 1987

[51] Int. Cl.⁴ .............................................. E04F 19/02
[52] U.S. Cl. ...................................... 24/297; 25/289; 25/607; 25/616
[58] Field of Search ................ 52/511, 718; 411/21, 411/508–510, 913, 512, 182; 403/405.1, 407.1; 24/289–292, 297, 453, 606, 607, 305, 616, 336, 339

[56] References Cited

U.S. PATENT DOCUMENTS

| | | | |
|---|---|---|---|
| 543,432 | 7/1895 | Thompson et al. | 24/607 |
| 854,073 | 5/1907 | Bruckner et al. | 24/607 |
| 1,082,455 | 12/1913 | Tilton | 24/607 |
| 1,086,568 | 2/1914 | Stirckler | 24/607 |
| 1,666,582 | 4/1928 | Raymond | 24/607 |
| 1,798,796 | 3/1931 | Johnson | |
| 1,803,485 | 5/1931 | Peters | 24/607 |
| 3,134,633 | 5/1964 | Hatfield | 411/508 X |
| 3,479,075 | 11/1969 | Swanno | 24/607 X |
| 3,864,789 | 2/1975 | Leitner | 52/718.1 X |
| 4,435,111 | 3/1984 | Mizusama | 411/21 X |
| 4,541,153 | 9/1985 | Schaty | 24/305 |

FOREIGN PATENT DOCUMENTS

| | | |
|---|---|---|
| 928101 | 3/1955 | Fed. Rep. of Germany . |
| 2845000 | 4/1980 | Fed. Rep. of Germany . |
| 1220181 | 3/1960 | France . |
| 83/04379 | 12/1983 | World Int. Prop. O. . |

Primary Examiner—Kenneth J. Dorner
Assistant Examiner—James R. Brittain
Attorney, Agent, or Firm—Thomas S. Szatkowski

[57] ABSTRACT

A two-part plastic clip for securing a trim moulding to a panel of a vehicle body comprises a hollow body member for reception over a threaded weld stud and a locking member slidable therein. The locking member has resilient arms which project through apertures in the body member both to hold the parts together for handling purpose before use and to hold the moulding against a flange of the body member after the clip has been inserted through a hole in it.

1 Claim, 3 Drawing Sheets

TWO-PART PLASTIC CLIP

BACKGROUND OF THE INVENTION

1. Field of the Invention

This invention relates to a two-part plastic clip, more especially a clip that is suitable for attaching a trim moulding to a panel from which a threaded stud projects, for example from a panel of a motor vehicle.

2. Description of the Prior Art

Plastic clips are known for attaching channel-shaped trim mouldings (hereafter referred to as trims) to studs welded to car body panels, but known designs vary in the ease with which the clips and trims can be eassembled, with the degree of retention achievable under normal running conditions, and the readiness with which they can be released and re-used if the trims have to be removed for repair or other purposes. It is the object of the present invention to provide a clip which is easy to assemble, affords a high degree of retention, and can readily permit removal of a trim for repair purposes.

SUMMARY OF THE INVENTION

According to the invention there is provided a two-part plastic clip suitable for attaching a trim moulding to a panel from which a threaded stud projects, comprising a hollow body member which constitutes the first part of the clip with resilient pawls to receive the stud and engage the thread thereof, an upper part of said hollow body member having apertures in its side wall to receive resilient arms of a locking member which constitutes the second part of the clip, the locking member being slidable in the body member and assuming under the influence of the resilient arms a condition in which the arms project outwardly through said apertures to secure an apertured moulding into a hole in which the body member has been inserted.

BRIEF DESCRIPTION OF THE DRAWINGS

FIG. 3 is a plan view,

FIG. 4 is a front view,

FIG. 5 is a bottom view,

FIG. 6 is a sectional view taken along the line 6—6 of FIG. 4,

FIG. 7 is a side view, and

FIG. 8 is a sectional view taken along the line 8—8 of FIG. 4.

FIG. 9 is a plan view,

FIG. 10 is a front view,

FIG. 11 is a bottom view,

FIG. 12 is a sectional view taken along the line 12—12 of FIG. 10, and

FIG. 13 is a side view.

DESCRIPTION OF THE PREFERRED EMBODIMENT

Preferably, the hollow body member of a clip in accordance with the invention has a flange disposed to abut a trim moulding, which is thus held between the flange and the resilient arms. The free ends of the arms are preferably shaped with angled surfaces to facilitate entry into a hole in the moulding, but resist retraction therefrom. Release of the locking member from the body member is preferably also provided for by pushing the locking member towards the panel to cause the arms to be retracted by engagement with an angular shoulder of the body member The locking member preferably has guide ribs accommodated in longitudinal grooves of the body member.

By using a clip in accordance with the invention, a trim moulding may be attached to a panel from which a threaded stud projects by inserting the body member of the clip into a hole in the moulding, which may lead to a closed channel. The moulding may be provided with a small hole in the exposed surface of the channel to permit access of a thin rod to depress the locking member and release it from the body portion if so required, to remove the moulding from the panel.

There now follows a description, to be read with reference to the accompanying drawings, of a two-part clip in accordance with the invention and illustrative thereof. It will be realized that this illustrative clip has been selected or description by way of example and not of limitation of the invention.

Figure 1:
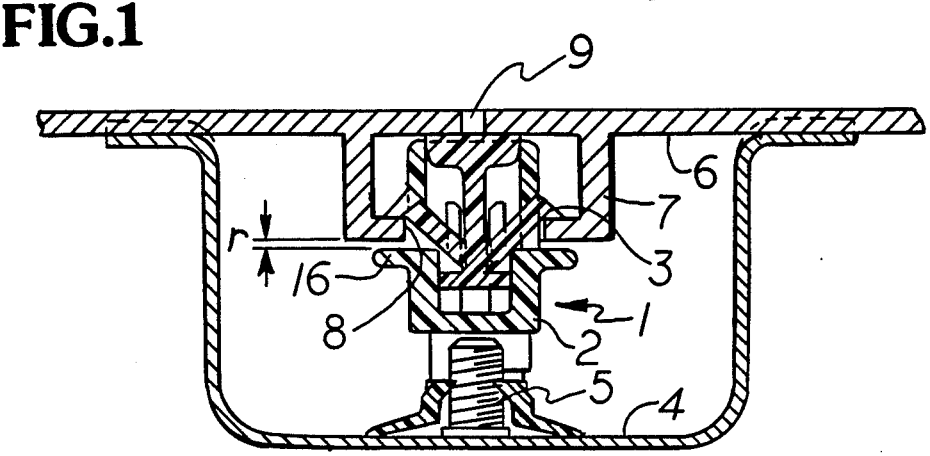
FIG. 1 is a sectional view showing the condition a decorative trim moulding fitted to a panel by means of the illustrative clip.
Figure 2:
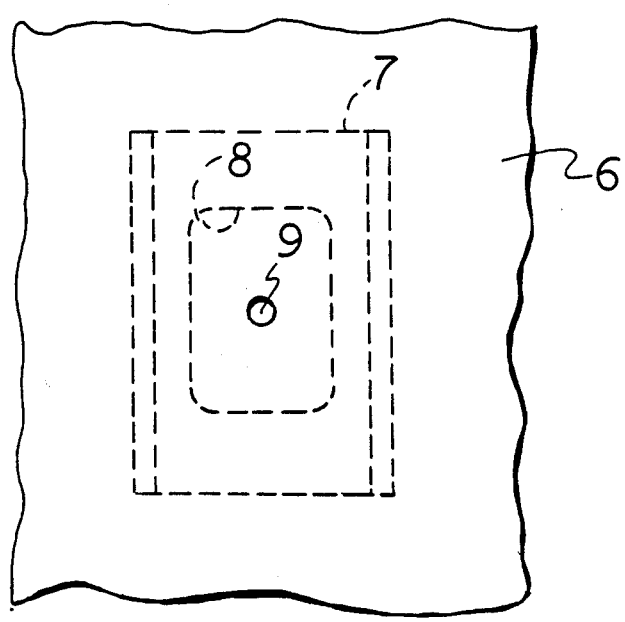
FIG. 2 is a plan view of the decorative moulding.

With reference to FIG. 1, the illustrative clip 1 comprises two parts, a body member 2 and a locking member 3, and it is assembled by putting the locking member 3 into the body member 2. While the assembled clip 1 engages with a threaded stud 5 welded to a panel 4, which is a vehicle body or the like, it also engages with a decorative trim moulding 6 by being inserted into a fitting hole of a C-channel bracket 7 formed as the back surface of the moulding 6, and is thus fixedly secured to the panel 4. It is preferable to make a fitting hole 8 formed in the bracket 7 a long hole in a substantially oblong configuration. A small hole 9 is formed above the hole 8 portion in the moulding 6. It is also preferable that the body member 2 and the locking member 3 are each moulded as one piece of thermoplastic synthetic resin.

Figure 3:
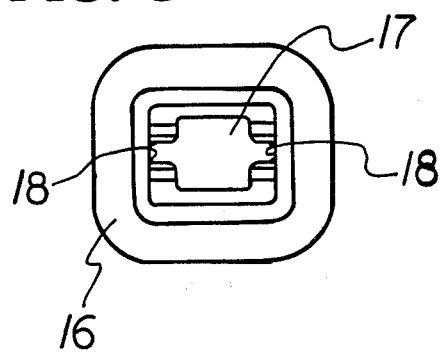
FIGS. 3 to 8 show a body member of the illustrative clip.
Figure 6:
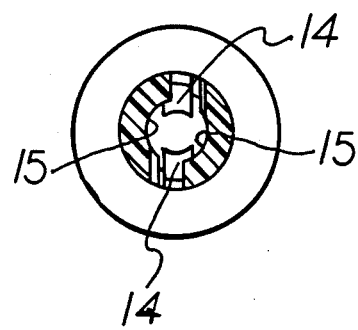
Figure 4:
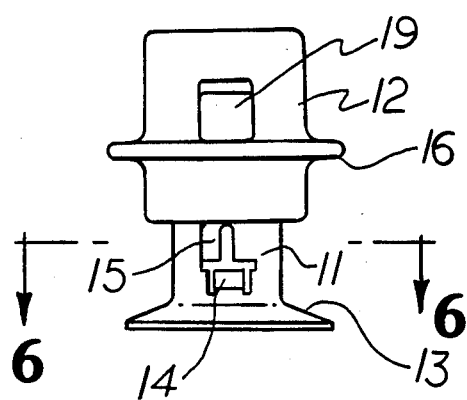
Figure 7:
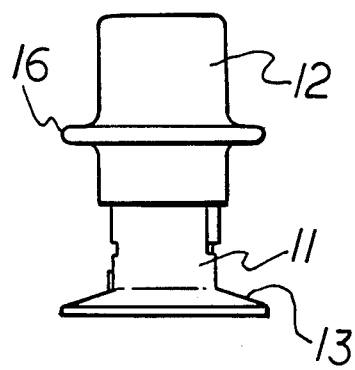
Figure 5:
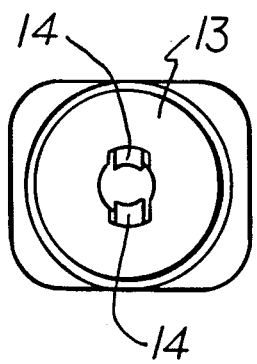
Figure 8:
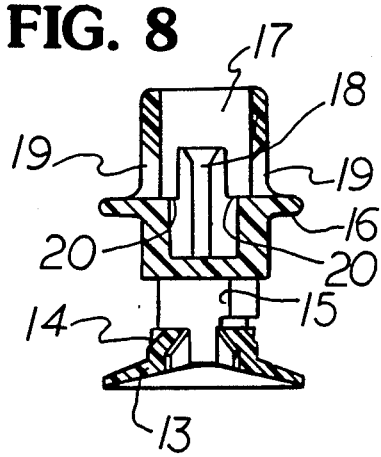
Figure 9:
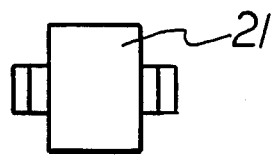
FIGS. 9 to 13 show a locking member of the illustrative clip.
Figure 12:
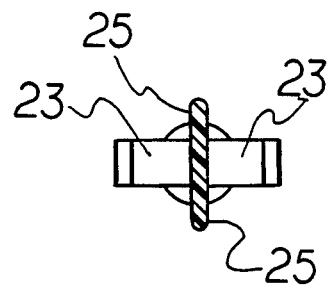
Figure 10:
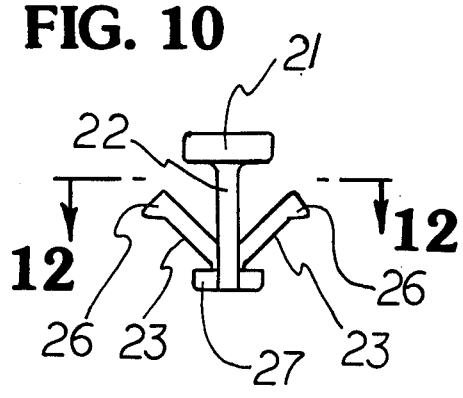
Figure 13:
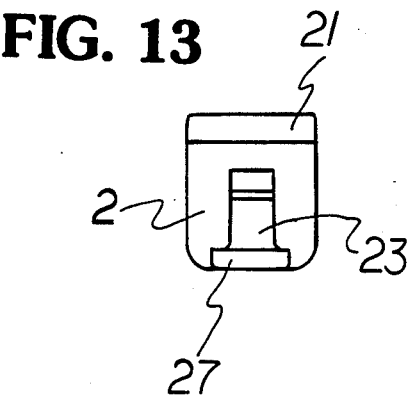
Figure 11:
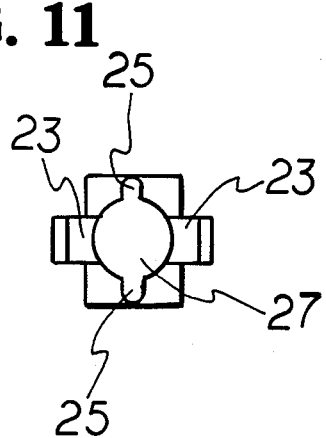

FIGS. 3 (a)–(f) show details of the body member 2. The body member 2 comprises a lower portion 11 which is hollow so that it can be pushed over the threaded stud 5 of the panel 4, and an upper portion 12 to be inserted into the fitting hole 8 of the bracket 7. In outer configuration the lower portion 11 is formed to be substantially cylindrical. Preferably, the upper portion 12 has an non-circular, preferably oblong, outer configuration in cross section so as to prevent the clip 1 from rotating with respect to the bracket 7.

The lower end of the lower portion 11 is formed with a flange 13 which is flared for stable sitting on the panel 4 and for facilitating the press-inserting of the stud 5. A pair of engagement pawls 14 are formed in the middle of the lower portion 11 for engagement with a thread of the threaded stud 5. Above the engagement pawls 14, guide walls 15 are formed to prevent the entire clip 1 from shaking.

The upper portion 12 is provided with a second flange 16 which functions as a stop when this portion has been inserted into the fitting hole 8 of the support bracket 7. In the embodiment shown in FIG. 1, the second flange 16 is located to define a space r between itself and the bracket 7 and it functions simply as a stop at the time of insertion. Of course, it is possible to make the second flange 16 a support for the bracket 7. As long as it functions as the stop for the support member, the flange 16 can be a protrusion.

An axial hole 17 of circular cross section is formed in the upper portion 12, downwardly from the upper end, and the locking member 3 is received in this hole. For easy insertion of the locking member, 3 and for enabling it to move axially inside the hole, it is preferable to make an upper portion of the axial hole 17 wide and rectangular in cross section and a lower portion rectangular with a small dimension corresponding to the outer configuration of the locking member 3. Any configuration, however, is suitable as long as the locking member 3 can be inserted into it easily, move axially inside it and be positioned stably. It is preferred that guide grooves 18 are formed in the axial hole 17 so that the locking member 3 can be inserted smoothly into the body member 2 without rotating relatively to the latter. The grooves are formed in the small-dimension portion of the hole.

The upper portion 12 is also provided, at a portion above the second flange 16, with diametrically opposed openings 19 disposed between the grooves 18. The openings 19 are provided in order to accommodate outwardly extended resilient arms 23 of the locking member 3 received in the hole 17, and their size and positions should be selected with reference to the shape of the end of the arm and the engagement position of the support bracket 7. It is preferred that the upper end edges of the openings 19 are slanted correspondingly to the extended ends of the arms.

In FIGS. 9-13, the locking member 3 is shown. It comprises a head 21, a shank 22 and a pair of resilient arms 23 extending from the lower end of the shank 22 upwardly and outwardly, and the head 21 is formed with a rectangular top surface. The shank 22 is formed in a plate-like shape and its side edges are formed as guide keys 25 which fit the guide grooves 18 of the axial hole 17 of the body member 2. The resilient arms 23 are made to have such a length that the ends thereof extend sufficiently out of the openings 19 when the locking member 3 has been inserted in the axial hole 17 of the body member 2. The ends of the arms are formed with engagement pawls 26 so as to be inserted easily into the hole 8 of the bracket 7 but not to be detached from it. That is to say, the upper surface of the engagement pawl gently slants downwardly but its lower surface is formed to be substantially horizontal. The lower end of the shank 22 is provided with a disk-like guide 27 to set the axis of the locking member 3 correctly to the axial hole 17. The diameter of the guide is formed to be slightly smaller than the small-dimension portion at the lower portion of the axial hole 27 of the body member 2. The head 21 is formed to be slightly smaller than the large-dimension portion of the axial hole 27.

As shown in FIG. 1, the clip 1 is assembled by inserting the locking member 3 into the axial hole 17 of the body member 2 in such a manner that the engagement pawls 26 at the ends of the resilient arms 23 extend out of the openings 19. For the insertion, when the guide keys 25 of the shank 22 of the locking member 3 are pressed in along the guide grooves 18 of the body member 2, the engagement pawls 26 of the arms 23 come in line with the openings 19 and with further pressing, they project outwardly from the openings 19. The locking member 3 is formed to have such a length that the head 21 can extend slightly above the body member, upon insertion, and when the head 21 remaining in this condition is pushed, the resilient arms 23, 23, which extend into an anchor-like shape, come into contact with an annular shoulder 20 of the small-dimension portion of the axial hole 17. When pushed more strongly, the arms 23, 23 incline inwardly and the engagement pawls 26 are retracted from the openings 19 inwardly.

The clip is delivered to a user in the condition that the locking member 3 is received in the body member 2 as described above. Since the locking member 3 is made to engage with the body member inside the hole 17 of the body member, it cannot be disengaged, and the clip is thus capable of being handled as one piece although it comprises two parts, thus being convenient for storage.

The upper portion 12 of the body member of the assembled clip 1 is inserted into the fitting hole 8 of the bracket 7. The insertion is continued until the second flange 16 comes into contact with the lower surface of the bracket 7, by which time the engagement pawls 26 of the arms 23 of the locking member 3 have been pressed inwardly and passed through the hole 8, recovering their outwardly extending condition to engage with the upper surface of the bracket 7. Thus, the clip is fitted to the decorative trim 6. A plurality of the clips are fitted to predetermined positions of the trim 6.

The decorative trim 6 supporting the clip 1 may then be fitted to the panel 4. This is accomplished by pushing the lower portion 11 of the body member 2 of the clip 1 over the threaded stud 5. In this case, when the decorative trim 6 is pressed strongly against the panel 4, the former bends slightly so that the lower portion of the bracket 7 is urged against the flange 16 to push the body member 2 downward. Upon releasing the pressure, the trim 6 returns to its relaxed condition in which it holds the clip 1 in tension. The decorative trim 6 is thus fixed to the panel 4. Between the second flange 16 and the support bracket 7, the space R is defined.

In case the decorative trim 6 is wanted to be removed, a pin or the like is inserted into the small hole 9 of the moulding 6 to press the head 21 of the locking member 3 inches. When the head is pressed, the arms 23, 23 are closed by the shoulder 20 of the axial hole 17 to retract the engagement pawls 26 to the inside. Accordingly, the engagement with the bracket 7 is released and the trim moulding 6 can be removed. Refitting or fitting of a new trim can be done by pressing the trim in while setting the hole 8 of the bracket 7 properly to the upper portion of the body member 2 or by detaching the clip 1 from the stud 5, fitting the clip 1 to the bracket 7 and repeating the above-described fitting operation.

I claim:

1. A two part plastic clip suitable for attaching a trim moulding to a panel from which a threaded stud projects, which comprises a hollow body member as the first part and a locking member as the second part, said hollow body member having resilient pawls to receive the stud and engage the thread thereof, an upper part of said member with apertures in its side wall to receive resilient arms of the locking member, longitudinal grooves to accommodate guide ribs of said locking member and a flange disposed to abut the trim moulding, which is thus held between the flange and the resilient arms, said locking member having resilient arms with free ends which are shaped with angled surfaces to facilitate entry into a hole in the moulding, but resist retraction therefrom, and further having guide ribs which are accommodated in the longitudinal grooves of the body member, the locking member being slideable in the body member and assuming under the influence of the resilient arms a condition in which the arms project outwardly through said apertures to secure the apertured moulding into a hole in which the body member has been inserted and wherein the locking member is released from the body member by pushing the locking member towards the panel to cause the arms to be retracted by engagement with an annular shoulder of the body member.

* * * * *